US012424190B2

(12) United States Patent
Wilson (10) Patent No.: US 12,424,190 B2
(45) Date of Patent: Sep. 23, 2025

(54) ADDITIONAL TIER STAND (71) Applicant: Sunbelt Power Equipment, LLC, Odessa, FL (US)

(72) Inventor: Michael Paul Wilson, Tampa, FL (US)

(73) Assignee: Sunbelt Power Equipment, LLC, Odessa, FL (US)

( * ) Notice: Subject to any disclaimer, the term of this patent is extended or adjusted under 35 U.S.C. 154(b) by 153 days.

(21) Appl. No.: 18/220,538

(22) Filed: Jul. 11, 2023

(65) Prior Publication Data

US 2025/0022445 A1 Jan. 16, 2025

(51) Int. Cl.
*G10G 5/00* (2006.01)
*F16M 11/10* (2006.01)
*F16M 11/26* (2006.01)

(52) U.S. Cl.
CPC .............. *G10G 5/00* (2013.01); *F16M 11/10* (2013.01); *F16M 11/26* (2013.01)

(58) Field of Classification Search
CPC ........... G10G 5/00; F16M 11/10; F16M 11/26
See application file for complete search history.

(56) References Cited

U.S. PATENT DOCUMENTS

| 3,887,291 | A | * | 6/1975 | Langren | ................ F16B 7/0493 403/385 |
| D257,987 | S | | 1/1981 | Schoenig | |
| 4,321,874 | A | | 3/1982 | Cenna, III | |
| D278,670 | S | | 5/1985 | Schoenig | |
| D289,952 | S | | 5/1987 | Kido | |
| 4,669,691 | A | | 6/1987 | Solomon | |
| 4,684,091 | A | | 8/1987 | Moreschi | |
| D295,471 | S | | 5/1988 | Lindskog | |
| 4,754,711 | A | | 7/1988 | Solomon | |
| 4,770,380 | A | | 9/1988 | Eason et al. | |
| D301,418 | S | | 6/1989 | Wernick | |
| 4,917,341 | A | | 4/1990 | Pirchio | |
| 5,520,292 | A | * | 5/1996 | Lombardi | .............. G10D 13/28 211/195 |
| D464,509 | S | | 10/2002 | Malizia | |
| 6,471,078 | B2 | * | 10/2002 | Pyle | ....................... G10D 13/02 211/85.6 |
| D468,133 | S | * | 1/2003 | Lauts | ......................... D6/681.1 |
| 7,086,632 | B2 | | 8/2006 | Hsien | |

(Continued)

FOREIGN PATENT DOCUMENTS

WO 2021197547 A1 10/2021

OTHER PUBLICATIONS

Exhibit A, Assembly Instructions for an On-Stage KSA7500 Universal Second Tier, available at https://on-stage.com/specsheets/KSA7500_Universal_2nd_Tier.pdf prior to the filing date of this application.

(Continued)

*Primary Examiner* — Eret C McNichols
(74) *Attorney, Agent, or Firm* — Erickson Law Group, PC (57) ABSTRACT An additional tier stand connectable to a base stand is disclosed. An embodiment of the additional tier stand has an extendable first leg having a first base stand mount, an extendable second leg having a second base stand mount, a cross member connected to and spanning between the first leg and the second leg, a first support arm, and a second support arm. The first and second support arms are supported on the cross member.

20 Claims, 10 Drawing Sheets (56) References Cited

U.S. PATENT DOCUMENTS

| | | | |
|---|---|---|---|
| 7,928,304 B2* | 4/2011 | Eason | F16B 7/0486 |
| | | | 84/412 |
| 7,932,451 B2 | 4/2011 | Workman et al. | |
| 8,367,919 B2 | 2/2013 | Belitz et al. | |
| 8,528,919 B2* | 9/2013 | Webster | B62B 3/108 |
| | | | 280/651 |
| 8,723,010 B1 | 5/2014 | Knights | |
| 9,046,117 B2 | 6/2015 | Belitz et al. | |
| 10,119,651 B2 | 11/2018 | Piovan | |
| 10,744,526 B2* | 8/2020 | Johnson | B25H 1/00 |
| 12,080,260 B2* | 9/2024 | Henkel | F16M 11/10 |
| 2008/0283698 A1* | 11/2008 | Lorenz | G10G 5/00 |
| | | | 248/166 |
| 2023/0031890 A1 | 2/2023 | Henkel | |

OTHER PUBLICATIONS

Exhibit B, Spec Sheet for an On-Stage KSA7500 Universal Second Tier, available at https://on-stage.com/specsheets/11982.pdf prior to the filing date of this application.

Exhibit C, Web page at https://on-stage.com/products/view/11982 available online prior to the filing date of this application.

Exhibit D, Spec Sheet for an On-Stage KSA7500 Universal Second Tier available at https://www.amazon.com/Stage-KSA7500-Second-Keyboard-Stands/dp/B0002E3DNU/?th=1 prior to the filing date of the application.

* cited by examiner

ADDITIONAL TIER STAND

FIELD OF THE INVENTION

This invention relates in general to musical keyboard stands.

BACKGROUND OF THE INVENTION

Musical keyboard stands support a musical keyboard above the ground. However, prior musical keyboard stands have a number of disadvantages, such as a lack of an additional tier for supporting an additional musical keyboard; lack of vertical adjustable arms; lack of simultaneously easily user-adjustable arms; and lack of a modular additional tier; among others.

SUMMARY

An additional tier stand connectable to a base stand is disclosed. In some embodiments the additional tier stand has an extendable first leg having a first base stand mount, an extendable second leg having a second base stand mount, a cross member connected to and spanning between the first leg and the second leg, a first support arm, and a second support arm. The first and second support arms are supported on the cross member.

Numerous other advantages and features of the present invention will become readily apparent from the following detailed description of the invention and the embodiments thereof, from the claims, and from the accompanying drawings.

DETAILED DESCRIPTION

The following description is presented to enable any person skilled in the art to make and use the invention. For the purposes of explanation, specific nomenclature is set forth to provide a plural understanding of the invention. While this invention is susceptible of embodiment in many different forms, this description describes and the drawings show specific embodiments of the invention with the understanding that the present disclosure is to be considered as an exemplification of the principles of the invention and is not intended to limit the invention to the specific embodiments illustrated.

Figure 1:
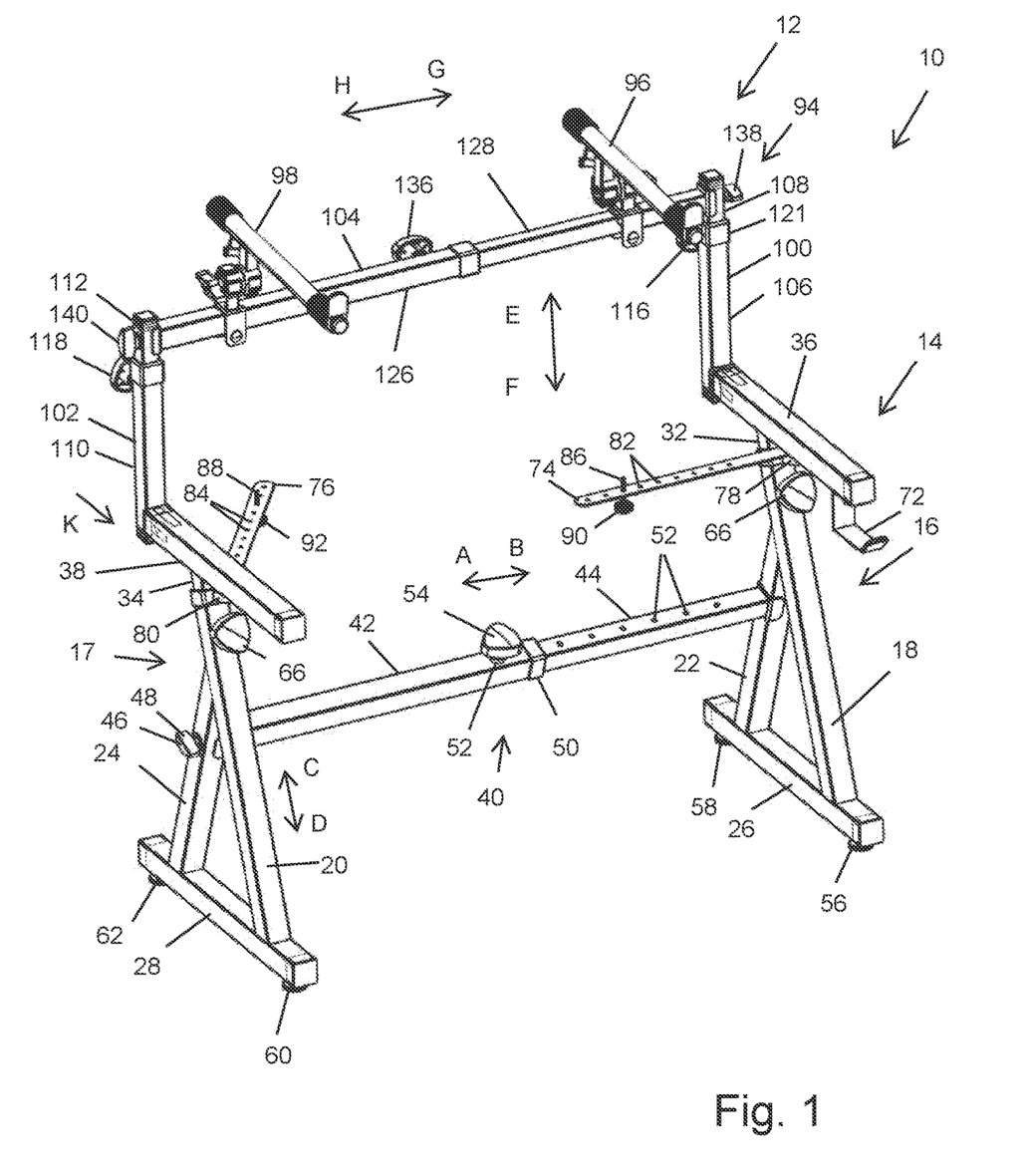
FIG. 1 is a front perspective view of an embodiment of the additional tier stand of the invention deployed on a base stand.

FIG. 1 shows an additional tier stand 12 deployed on a base stand 14 to form a combined stand 10. While the additional tier stand 12 is shown deployed in base stand 14, the additional tier stand is modular and can be deployed on other base stands.

Base stand 14 comprises two legs pairs 16, 17. Each leg pair comprises a first leg 18, 20 and a second leg 22, 24. The first leg 18, 20 intersects the second leg 22, 24. The upper ends of each of the first and second legs are angled toward each other and the lower ends of the first and second legs are angled away from each other. Each of the first and second legs connect to a corresponding base member 26, 28. The first leg, second leg, and base leg form a triangle as shown in FIG. 1. The second leg terminates at the first leg and the first leg extends beyond the second leg. The top of each first leg is open to receive a third leg 32, 34. The third leg 32, 34 is slidably longitudinally received in the corresponding first leg 18, 20. The third legs 32, 34 are connected to first support arms 36, 38 opposite the first leg 18, 20. In some embodiments, the first support arms 36, 38 and base members 26, 28 are horizontal, if the stand 14 is deployed on a horizontal surface. In some embodiments, the first support arms 36, 38 are parallel or substantially parallel to the base members 26, 28.

The base stand 14 comprises a first cross member 40, which comprises a first segment 42 and a second segment 44. The cross member 40 is fixed at opposite ends to the second legs 22, 24. It is fixed by threaded bolts 46 (right side not shown) that extend through apertures in the second legs into a threaded aperture in the terminal ends of the cross member 40. The threaded bolts 46 may comprise hand-turn knobs 48. The first and second segments 42, 44 are longitudinally moveable in the directions A and B relative to the other. The second segment 44 is received in the first segment at a junction 50. The second segment 44 comprises a plurality of width set apertures 52 spaced apart along a longitudinal length of the second segment.

Figures 2, 3:
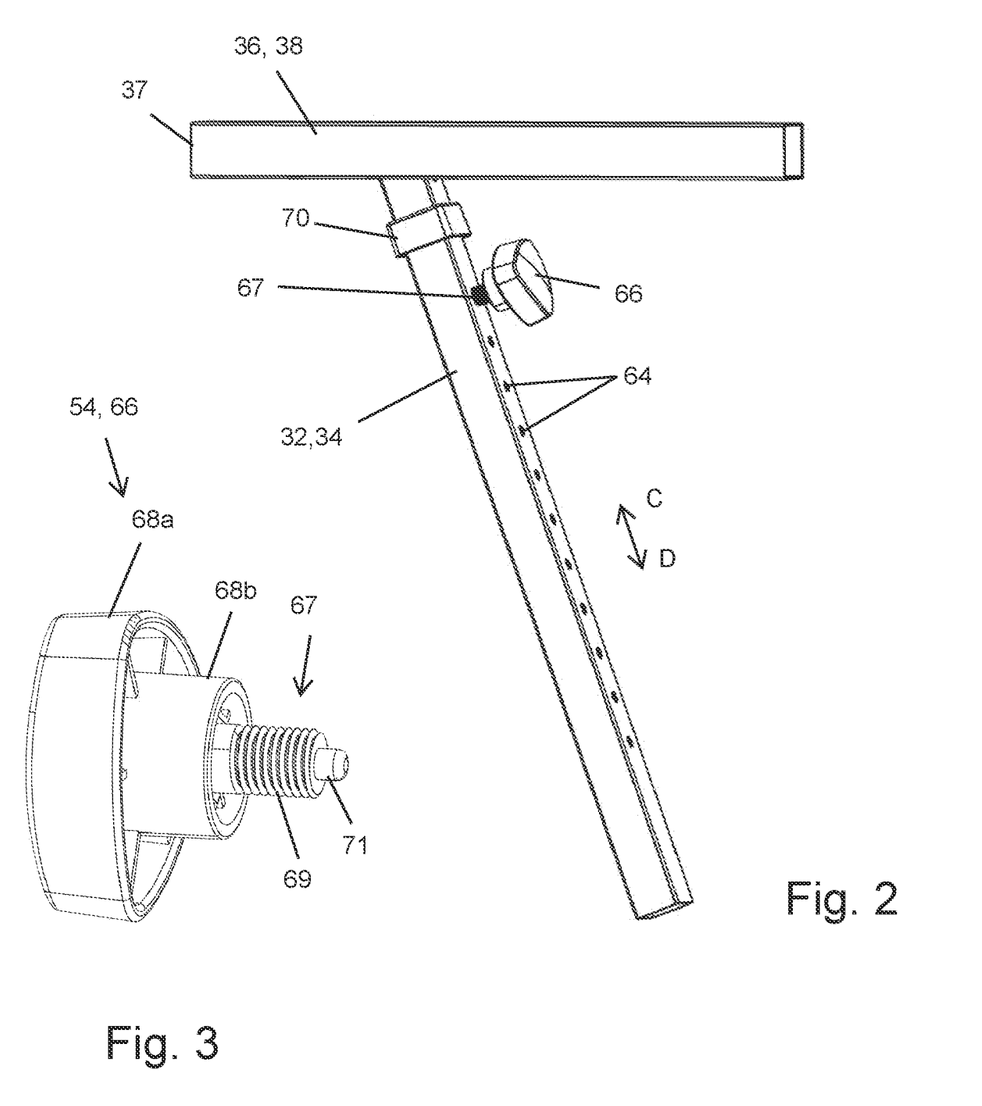
FIG. 2 is a side perspective view of a leg and an arm of the base stand of FIG. 1.
FIG. 3 is a set pin of the additional tier stand and of the base stand of FIG. 1.
Figure 4:
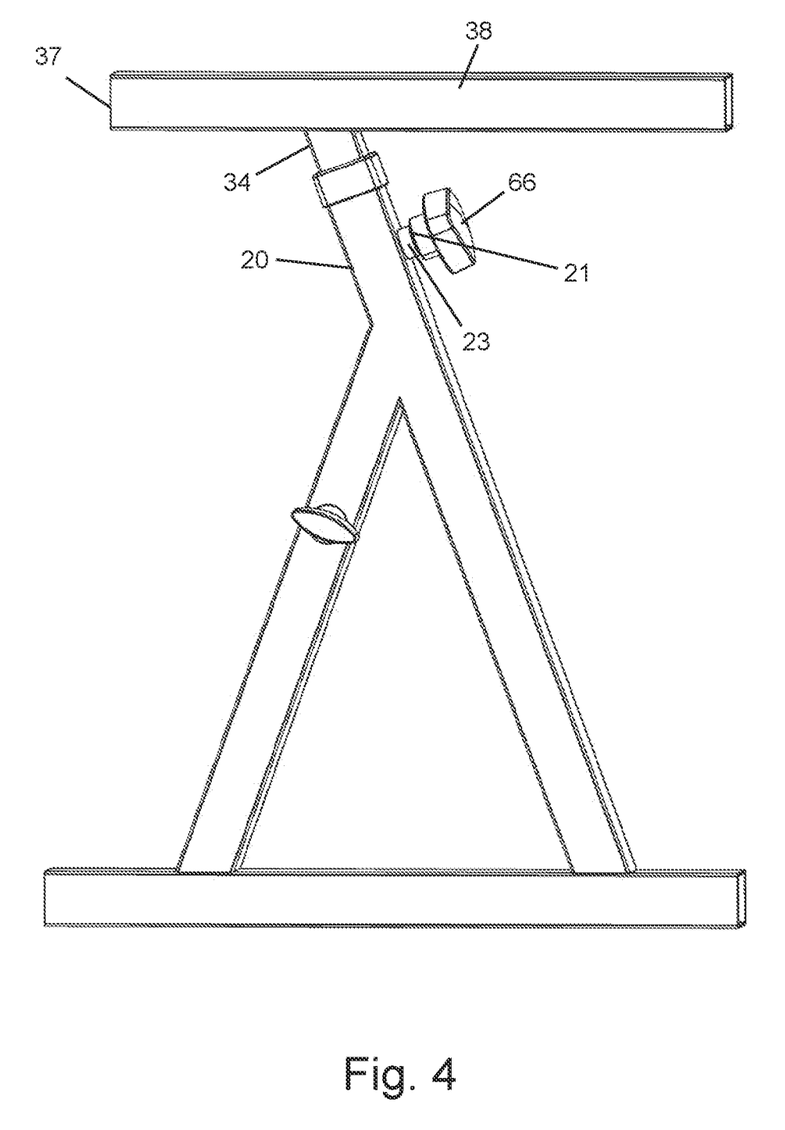
FIG. 4 is a side perspective view of legs and an arm of the base stand of FIG. 1.

A stop or set pin 54 is positionable through aperture(s) in the first segment 42 and through one of the width set apertures 52, to secure the first segment relative to the second segment and to set the width of the crossmember. In some embodiments, the pin 54 comprises a knob 68a, a base 68b, and a shaft 67, as shown in FIG. 3. The knob 68a is fixed to the base 68b. The base 68b is fixed to the shaft 67. In some embodiments, the shaft comprises a threaded portion 69 and a non-threaded pin portion 71. The threaded portion is adjacent the knob and base. The pin portion 71 is at the terminal end of the shaft 67 opposite of the knob.

The first segment 42 may comprise a collar 53 at the aperture through the wall of the first segment. The collar 53 comprises a threaded interior channel. The threaded portion 69 engages the threads of the threaded interior channel of the collar 53. As the knob is tightened, the pin portion 71 advances into the hollow interior channel of the first segment 42 and into a selected one of the plurality of width set apertures 52 that corresponds to the desired width of the cross member 40 and/or the spaced apart width or locations of the support arms 36, 38. To withdraw the pin portion 71 from the selected one of the plurality of width set apertures 52, the knob 68a is rotated in a reverse direction, such as counter-clockwise, and the pin portion 71 withdraws from the selected one of the plurality of width set aperture 52 and from the hollow interior channel of the first segment 42. When the pin is withdrawn from the selected one of the plurality of width set apertures 52, the width of the cross member and the distance between the support arms 36, 38 can be adjusted in the directions A, B to the desired width and then the pin portion 71 can be advanced by rotating the knob and engaging with the corresponding one of the plurality of width set apertures 52 to secure the width of the cross member and the distance between the support arms 36, 38.

By selectively engaging width set apertures 52 with the pin 54, the width of the crossmember is adjusted and set and therefore the width between the first support arms 36, 38 is adjusted and set as well as the width between the leg pairs 16, 17. The width of the stand 14 can be selectively adjusted in the directions A and B by moving the first segment and/or second segments 42, 44 relative to each other and selectively engaging the desired width set aperture 52 that corresponds to the desired width with the pin 54.

Each of the base members 26, 28 comprises a plurality of feet 56, 58, 60, 62. The feet may be positioned at opposite ends of the base members 26, 28. The feet may comprise a threaded shaft that is received into a corresponding threaded aperture in the bottom of the corresponding base member, so that by rotating the shaft the height of the feet relative to the corresponding base member can be adjusted. The height of each of the feet may be independently adjusted to level the stand 14 on an uneven external surface.

The stand 14 is height adjustable in that the height of the support arms 36, 38 can be adjusted relative to the base members 26, 28 and an exterior surface such as a floor that the feet 56, 58, 60, 62 are supported on. Each third leg 32, 34 is slidably longitudinally received in the corresponding first leg 18, 20 at a junction 70. The third leg 32, 34 and/or the first leg 18, 20 can be moved up and down in the directions C and D relative to the other. A stop or set pin 66 can be selectively engaged with one of the plurality of height set apertures 64 that are spaced apart along a length of the third leg 32, 34 as shown in FIG. 2. The set pin 66 is placed through an aperture 21 (not shown for leg 20) in the first leg and into a selected one of the plurality of height set apertures 64 that corresponds to the desired height of the leg and the support arm 36, 38.

In some embodiments, the set pin 66 comprises a knob 68a, a base 68b, and a shaft 67, as shown in FIG. 3. The knob 68a is fixed to the base 68b. The base 68b is fixed to the shaft 67. In some embodiments, the shaft comprises a threaded portion 69 and a non-threaded pin portion 71. The threaded portion is adjacent the knob and base. The pin portion 71 is at the terminal end of the shaft 67 opposite of the knob.

The first leg 18, 20 may comprise a collar 23 at the aperture through the wall of the first leg. The collar has a threaded interior channel. The threaded portion 69 engages the threads of the threaded interior channel of the collar 23. As the knob is tightened, the pin portion 71 advances into the hollow interior channel of the first leg 18, 20 and into a selected one of the plurality of height set apertures 64 that corresponds to the desired height of the leg and the support arm 36, 38. To withdraw the pin portion 71 from the selected one of the plurality of height set apertures 64, the knob 68a is rotated in a reverse direction, such as counter-clockwise, and the pin portion 71 withdraws from the selected one of the plurality of height set apertures 64 and from the hollow interior channel of the first leg. When the pin is withdrawn from the selected one of the plurality of height set apertures 64, the height of the leg and of the support arm 36, 38 can be adjusted to the desired height and then the pin portion 71 can be advanced by rotating the knob and engaged with the corresponding one of the plurality of height set apertures 64 to secure the height of the leg and of the support arms 36, 38.

One or more of the support arms 36, 38 may comprise a hook 72 extending from a front of the support member, such as shown in FIG. 1.

The stand 14 may comprise keyboard connector arms 74, 76. The connector arms 74, 76 are releasably connected to the respective first support arms 36, 38 by fasteners, such as threaded bolts 78, 80 that engaged threaded apertures on the bottom of the respective first support arms 36, 38. Each of the connector arms 74, 76 comprise a plurality of connector apertures 82, 84. A threaded bolt 86, 88 is selectively engaged through a selected one of the plurality of connector apertures 82, 84 and then optionally further through an item supported on the arms 36, 38, such as a musical keyboard (not shown). Each of the bolts 86, 88 may comprise a hand-turnable knob 90, 92. Each of the connector arms 74, 76 are pivotable about the threaded bolts 70, 80 so the arms can be positioned to engage the desired location on the item supported on the arms 36, 38, such as a musical keyboard (not shown).

The additional tier stand 12 comprises a frame 94 and one, two, or more support arms 96, 98. The frame 94, comprises a first leg 100, a second leg 102, and a cross member 104.

The first and second legs 100, 102 each comprise a first segment 106, 110, and a second segment 108, 112. In some embodiments, first and second legs 100, 102 are identical, and so the first segments 106, 110 are identical, and the second segments 108,112 are identical. The second segment 108, 112 is sized to be slidably received within a hollow interior of the first segment 106, 110. The first segment 106, 110 may comprise a collar 121, 123 at the opening to the hollow interior of the first segment 106, 110. The second segments 108, 112 comprise a plurality of height set apertures 114 (not shown for segment 112) along a length of the segment 108, 112 as shown in FIG. 3. Each of the first segments 106, 110 has an aperture 119 (not shown for segment 106) that receives a stop or set pin 116, 118. Set pins 116, 118 are identical to set pins 54, 66.

The first segments 106, 110 comprise set aperture collars 120 (not shown for segment 106) at the aperture through the wall of the first segment. The collar 120 comprises a threaded interior channel. The threaded portion 69 of the set pin 116, 118 engages the threads of the threaded interior channel of the collar 120. As the knob is tightened, the pin portion 71 advances into the hollow interior channel of the first segment 106, 110 and into a selected one of the plurality of height set apertures 114 that corresponds to the desired height of the cross member 104 and the legs 100, 102. To withdraw the pin portion 71 from the selected one of the plurality of height set apertures 114, the knob 68a is rotated in a reverse direction, such as counter-clockwise, and the pin portion 71 withdraws from the selected one of the plurality of height set apertures 114 and from the hollow interior channel of the first segment 106, 110. When the pin is withdrawn from the selected one of the plurality of height set apertures 114, the height of the leg 100, 102 and of the cross member 104 can be adjusted to the desired height and then the pin portion 71 can be advanced by rotating the knob and engage with the corresponding one of the plurality of height set apertures 114 to secure the height of the leg 100, 102.

The frame 94 is height adjustable in the directions E and F via the height adjustable legs 100, 102. The frame and the legs can be extended in the direction E and retracted in the direction F. A user can select the aperture 114 of the second segments 108, 112 that corresponds to the desired height of the legs or the desired height of the frame, cross member 104, and/or arms 96, 98, and deploy the set pins 116, 118 through the aperture 119 in the first segment 106, 110 and into the selected aperture 114 of the second segment 108, 112 to secure the legs, frame, crossmember, and/or arms at the desired height.

In some embodiments, the height is adjusted by the following method. A first of the set pins 116, 118 is unthreaded within the collar 120 to withdraw the pin portion 71 from the selected one of the plurality of height set apertures 114. In some embodiments the length of the pin portion 71, the length of the threaded portion 69, and/or the length of the threads in the aperture of the first segment 106, 110/collar 120 are configured such that at least a portion of the threaded portion 69 is still engaged with the threads of the collar 120 when the pin portion 71 is withdrawn from and clear of the selected one of the plurality of height set apertures 114. Therefore, the set pin 116, 118 does not fall out of the first segment 106, 110 or the collar 120 when the pin portion 71 is withdrawn from the selected one of the plurality of height set apertures 114 and therefore withdrawn from the second segment 108, 112. The set pins 116, 118 can be engaged simultaneously with the first segment 106, 110 while disengaged from the second segment 108, 112 depending on the extent to which the set pins 116, 118 are deployed, such as threaded, into the first segment 106, 110. In some embodiments, the one or more or all of other set pins 54, 66, 135 and corresponding segments/collars are also arranged so that set pins can be engaged simultaneously with the first segment or first leg while disengaged from the second segment or third leg depending on the extent to which the set pins are deployed, such as threaded, into the first segment or first leg. This engagement with the first segment 106, 110 while disengaged from the second segment 108, 112, allows a user to back out a first of pins 116, 118 and a second of pins 116, 118, and then to adjust the heights of the legs or cross member, and therefore the height of the arms 96, 98, and then engage, such as by threading in, a first of pins 116, 118 and a second of pins 116, 118 with the corresponding second segments, and more particularly the selected one of the plurality of height set apertures 114 of the corresponding second segments. Therefore, the height of the arms 96, 98 can be adjusted in sync by raising and/or lowering, in the directions E, F, the cross member 104 which will correspondingly move the attached leg second segments 108, 112 when the pins are disengaged from the second segments.

The cross member 104 comprises a first segment 126 and a second segment 128. The second segment 128 is sized to be slidably received within a hollow interior of the first segment 126. The first segment 126 comprises an opening collar 130 at the opening to the hollow interior of the first segment 126. The second segment 128 comprises a plurality of width set apertures 132 spaced apart along its length. The width of the crossmember may be set by selectively engaging a stop or set pin 136 with a corresponding one of the plurality of width set apertures 132. The set pin 136 is identical to set pins 54, 66.

The first segment 126 may comprise a collar 134 at the aperture through the wall of the first segment. The collar 134 comprises a threaded interior channel. The threaded portion 69 of the set pin 136 engages the threads of the threaded interior channel of the collar 134. As the knob of the set pin 136 is tightened, the pin portion 71 advances into the hollow interior channel of the first segment 126 and into a selected one of the plurality of width set apertures 132 that corresponds to the desired width of the cross member 104 and the spaced apart width or locations of the legs 100, 102. To withdraw the pin portion 71 from the selected one of the plurality of width set aperture 132, the knob 68a is rotated in a reverse direction, such as counter-clockwise, and the pin portion 71 withdraws from the selected one of the plurality of width set aperture 132 and from the hollow interior channel of the first segment 126. When the pin is withdrawn from the selected one of the plurality of width set apertures 132, the width of the cross member 104 and the spaced apart width of legs 100, 102 can be adjusted to the desired width and then the pin portion 71 can be advanced by rotating the knob and engaging with the corresponding one of the plurality of width set aperture 132 to secure the width of the cross member 104 and the spaced apart width of legs 100, 102, such as to align with the base support arms 36, 38. For example, the width of the cross member 104 may be set so that the legs 100, 102 and mounts 240, 242 align with the hollow interior of the base support arms 36, 38 open at the terminal ends 71 of each of base support arms 36, 38 so that the additional tier stand 12 can be mounted to the base stand 14.

By selectively engaging width set apertures 132 with the set pin 136, the width of the crossmember 104 is adjusted and set and therefore the width of the frame 94 is adjusted and set as well as the width between the legs 100, 102, and mounts 240, 242. The width of the stand 12 can be selectively adjusted in the directions G and H by moving the first segment 126 and/or second segment 128 relative to each other and selectively engaging the desired width set aperture 132 that corresponds to the desired width with the pin 136.

The cross member 104 is fixed to each of the legs 100, 102 by fasteners 138, 140, such as bolts, on opposite terminal ends. The fasteners 138, 140 extend through legs 100, 102, and in particular, second segments 108, 112, and are releasably received into threaded apertures in the terminal ends of the cross member 104. In some embodiments, the terminal ends of the cross member 104 comprise cupping flanges 142, 144 that extend on opposite sides of the second segments 108, 112 as labeled in FIG. 5 and shown in FIGS. 1 and 5. In some embodiments, the cross member 104 can be selectively attached to the second segments 108, 112 at alternative attachment apertures 146 or 148 (not shown for segment 112).

Figure 6:
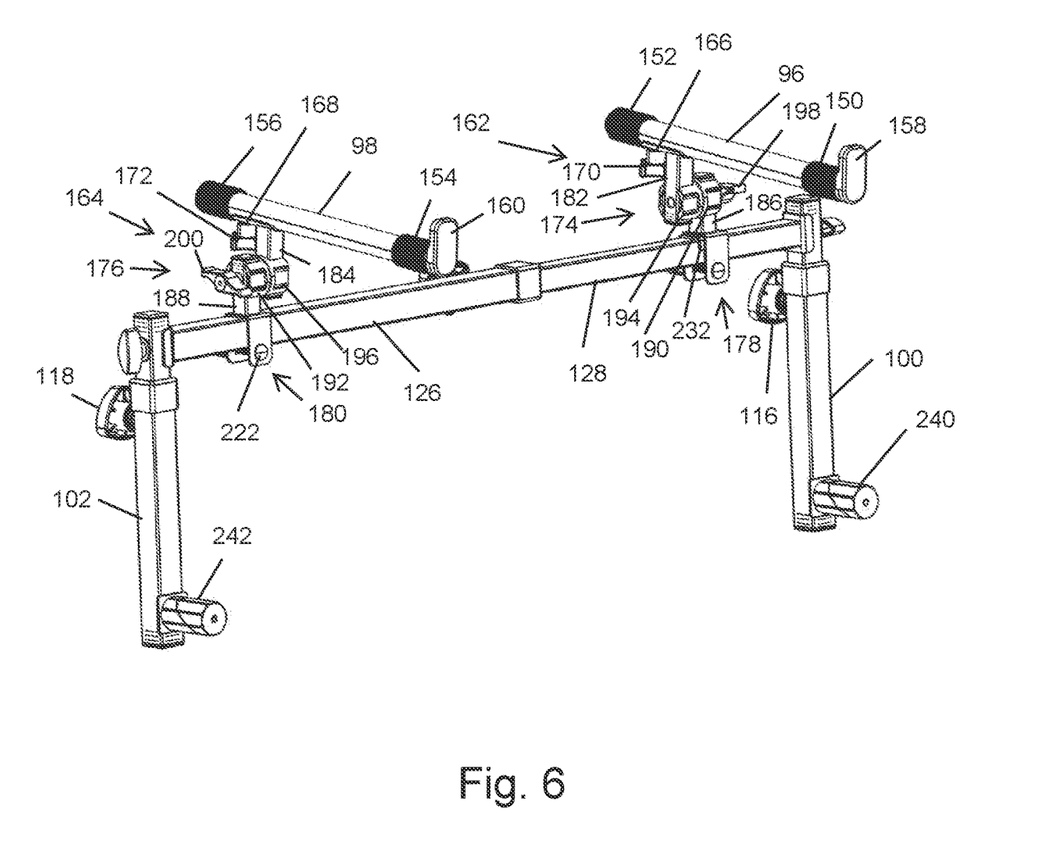
FIG. 6 is a front perspective view of the additional tier stand of FIG. 1.

The arms 96, 98 of the stand 12 comprise front and rear pads 150, 152, 154, 156 that encircle the arms, as shown in FIG. 6. The front and rear pads may comprise longitudinal ribbing. The front and rear pads provide a gripping surface or a non-slip surface for an item supported on the arms such as a musical keyboard. The front of each arm 96, 98 comprises a lip 158, 160. The lip 158, 160 provides a forward stop for items supported on the arms 96, 98, such as a musical keyboard, synthesizer, drum machine, speakers, laptop computer, or other devices for music production.

Figure 13:
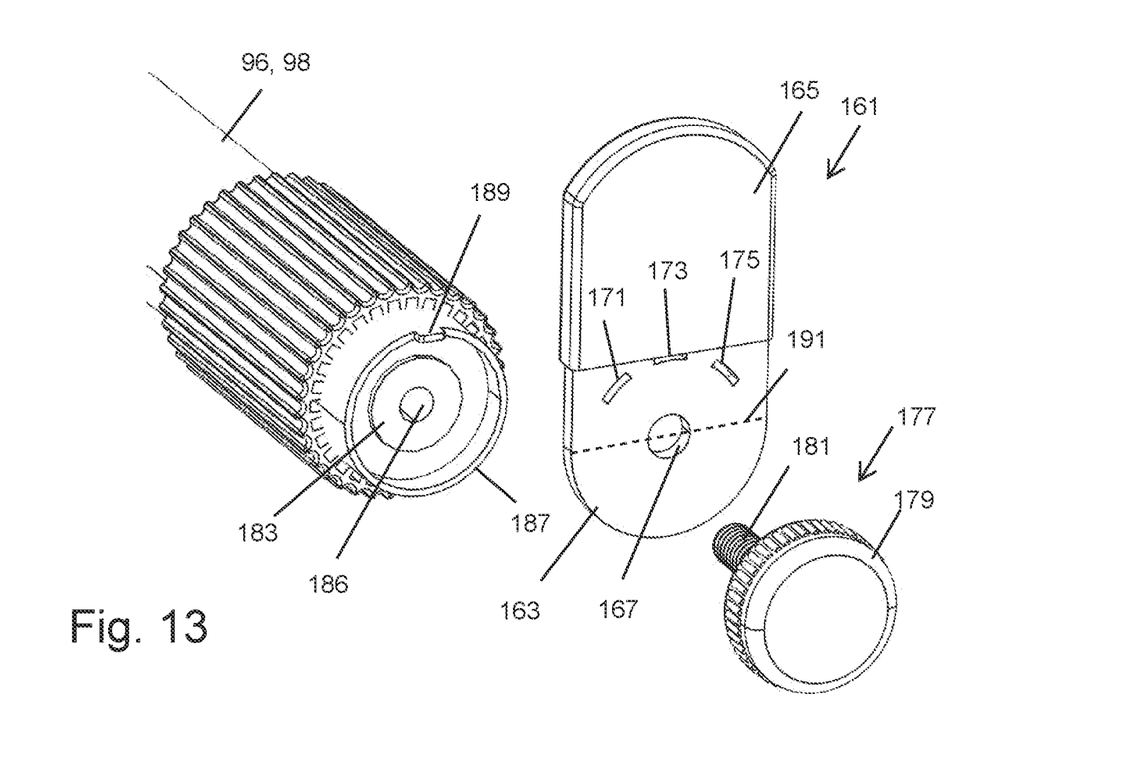
FIG. 13 is an exploded end perspective view of the arms of FIG. 12.

In some embodiments, the arms 96, 98 comprises second embodiment lip 161, as shown in FIGS. 1, 5, 12, and 13. The lips 161 comprise a main body 163 and a cover 165. The cover 165 covers a top of the body 163. The body comprises a mount aperture 167. Above the mount aperture 167 are a plurality of lip angle set apertures 171, 173, 175 radially positioned about the aperture 167. The lip is releasably connected to the arms 96, 98 by a fastener 177, such as a bolt. The fastener comprises a head 179 connected to a threaded shaft 181. The head 179 may be a hand-turnable knob. The shaft extends through the mount aperture 167 and is releaseably received in a threaded channel 186 of a mount 183 at an end of the arm 96, 98. The end of the arm 96, 98 comprises a rim 187. The rim 187 comprises a protrusion 189 as shown in FIG. 13. A selected one of the plurality lip angle set apertures 171, 173, 175 is aligned with and receives the protrusion 189 when the lip is set and held against the rim 187 of the arm 96,98 by the fastener 177. Therefore, the relative angle of the lip can be adjusted by aligning with the desired one of the plurality lip angle set apertures 171,173, 175 with the protrusion 189 and deploying the desired lip angle set aperture on the protrusion.

In some embodiments, a user may desire to select to deploy the protrusion at one of the side lip angle set apertures 171, 175, which will result in the lip extending a vertical height that is less than the vertical height at top aperture 173. This lower vertical height at apertures 171, 175 may be desirable so that the lip does not interfere with the keyboard or other device deployed on the arms or a portion of that keyboard or device. In some embodiments, aperture 173 is ninety degrees from a plane 191 bisecting the apertures 167 into upper and lower portions. The plane 191 will be horizontal when the protrusion is deployed at apertures 173 and the corresponding arm 96, 98 is horizontal. In some embodiments aperture 173 is ninety degrees from plane 191. In some embodiments, apertures 171, 175 are 45 degrees from apertures 173, such as measured from the centers of the apertures 171, 173, 175. Therefore, the lip 171 can be deployed in a vertical or ninety-degree position at aperture 173, or at a first angled position at aperture 171, or at a second angled position at aperture 175.

Figure 14:
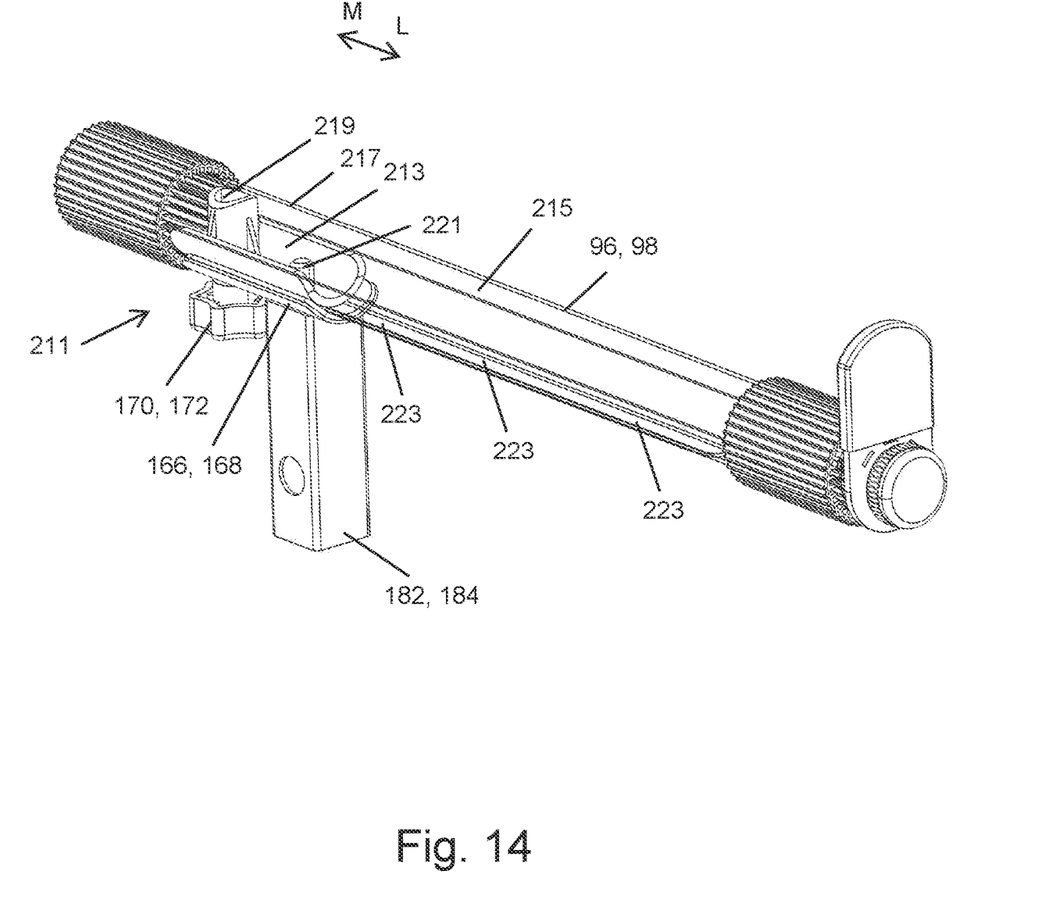
FIG. 14 is a side perspective view of the arm and a portion of the arm mount of the additional tier stand of FIG. 1, with the arm shown transparently.

The arms 96, 98 are connected to the cross member 104 by arm mounts 162, 164. The arm mounts 162, 164 comprise a cradle 166, 168 that may be curved and in which the arm lays. The arms 96, 98 are fixed to the cradle 166, 168 by a fastener 170, 172, such as a bolt. The fastener extends through the cradle and is threaded into a channel member 213 within the arm 96, 98, as shown in FIG. 14 and more fully explained below.

The arm mounts 162, 164 further comprise an elevation angle adjust mechanism 174, 176 and a cross member connection mechanism 178, 180. A first post 182, 184 connects the cradle 166, 168 to the angle adjustment mechanism 174, 176. A second post 186, 188 connects the angle adjustment mechanism to the cross member connection mechanism 178, 180.

The angle adjust mechanisms 174, 176 comprise a first face gear 190, 192, a second face gear 194, 196, and a fastener 198, 200, such as a bolt. The first face gear 190, 192 face and enmeshes with a second face gear 194, 196. The fastener releasably secures the first and second face gears to each other.

Figure 8:
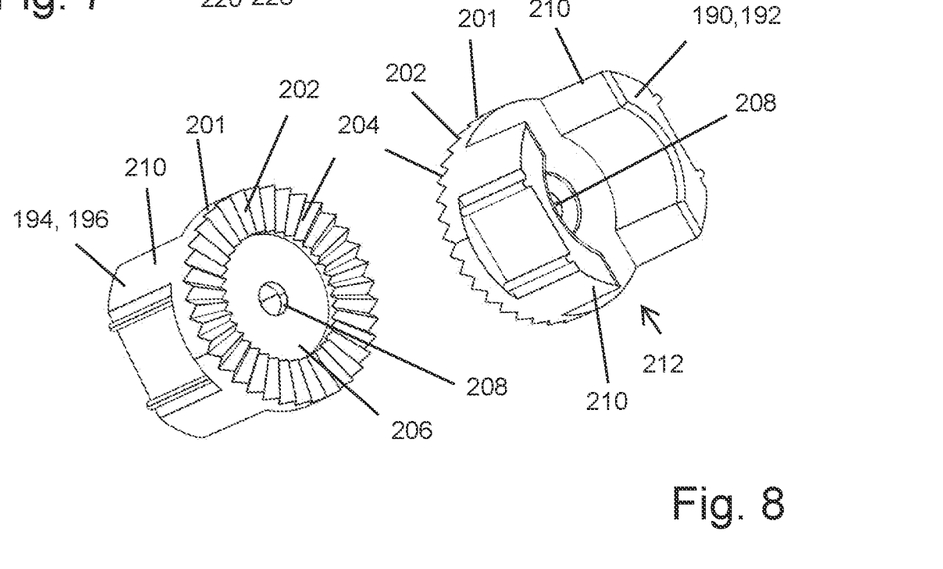
FIG. 8 is an exploded perspective view of first and second face gears of the arm mounts of the additional tier stand of FIGS. 7 and 1.

FIG. 8 shows an exploded view of the first face gear 190, 192, a second face gear 194, 196. In some embodiments, the first face gear is the same as the second face gear. The face gears comprise a circular member 201 comprising a circular face 202. The circular face comprises a teeth ring 204. The teeth ring comprise a plurality of teeth as shown in FIG. 8. The circular face 202 comprises a circular interior wall 206 that is recessed from the teeth of the teeth ring 204 as shown in FIG. 8. At the center of the circular face 202 is an aperture 208. Two mounts 210 extend from the circular member 201 opposite the circular face 202. The mounts are spaced apart to provide a post channel 212 between the mounts 210 for receiving the first or second posts 182, 184, 186, 188.

The fastener 198, 200 releasably joins the first face gear 190, 192 to the second face gear 194, 196. The fastener also joins the second post 186, 188 to the first face gear 190, 192. The fastener also joins the second face gear to the first post 182, 184. The fastener 198, 200, and in particular the shaft (not shown) of the fastener, extends through the second post 186, 188 to the first face gear 190, 192, the second face gear 194, 196, and into the first post 182, 184. In some embodiments, some or all of the apertures in the components that the fastener passes through or enters comprise a threaded perimeter that engages threads on the shaft of the fastener. In some embodiments, at least the fastener engages threads in the first post 182, 184 or the second face gear 194, 196 to hold the first face gear to the second face gear, and in some cases to hold the second post 186, 188 to the second face gear.

In operation, the rotational position of the second face gear can be changed relative to the first face gear about the axis of the shaft of the fastener and about the central axis of the face gears at the aperture 208. A change in the rotational position of the second face gear will change the rotational position of the first post 183, 184, and will change the tilt position or elevation angle of the arm 96, 98. Therefore, the tilt position or elevation angle of the arms 96, 98 can be adjusted down in the direction I of FIG. 9 or up in the direction J.

The rotational position of second face gear can be changed when the fastener is loosened by turning the handle 199 until there is sufficient space between the first and second face gears for the teeth of the teeth rings 204 to disengage from each other and for the teeth to rotate about the central axis of the face gears. When the fastener is loosened, more space is provided along the shaft between the second face gear and the first face gear. This allows the second face gear to be withdrawn back axially away from the first face gear. When the second face gear is withdrawn a length equal to or greater than a depth of the teeth of the teeth ring 204, then the first and/or second face gears can rotate about the central axis of the face gears at the aperture 208 and the teeth of each teeth ring 204 will pass each other without engagement or without engagement sufficient to prevent the rotation of the first and/or second face gears. Rotation of the second face gear about the axis of the fastener and the central axis of the second face gear at the aperture 208 will change the relative elevation angle or tilt position of the arm 96, 98.

Figure 7:
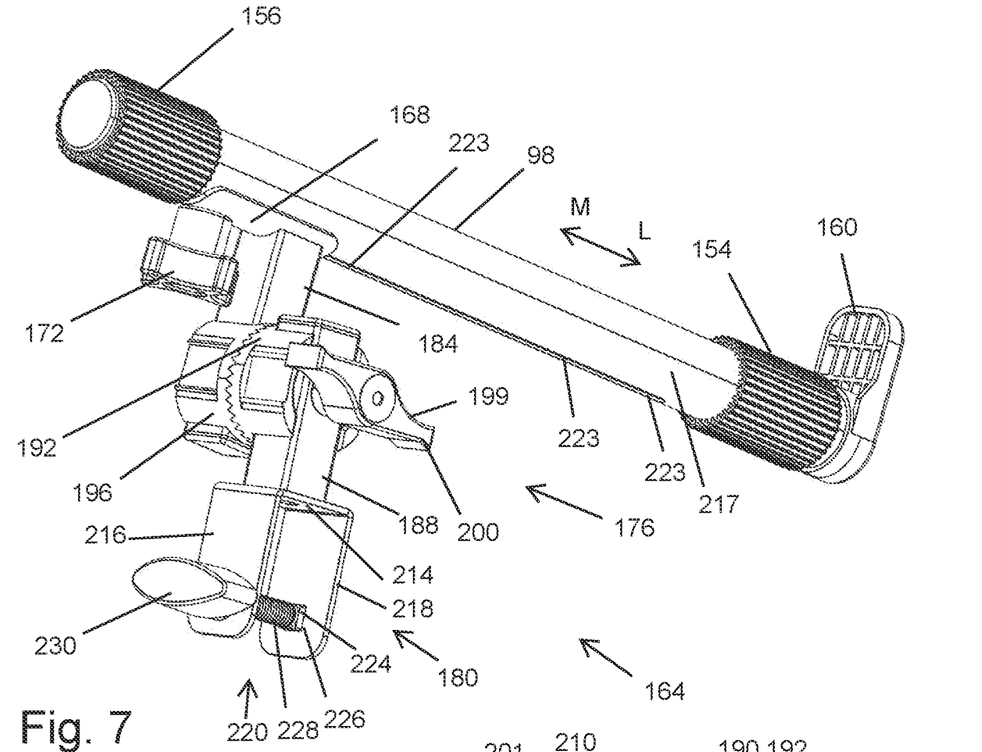
FIG. 7 is a side perspective view of an arm and an arm mount of the additional tier stand of FIG. 1.
Figure 9:
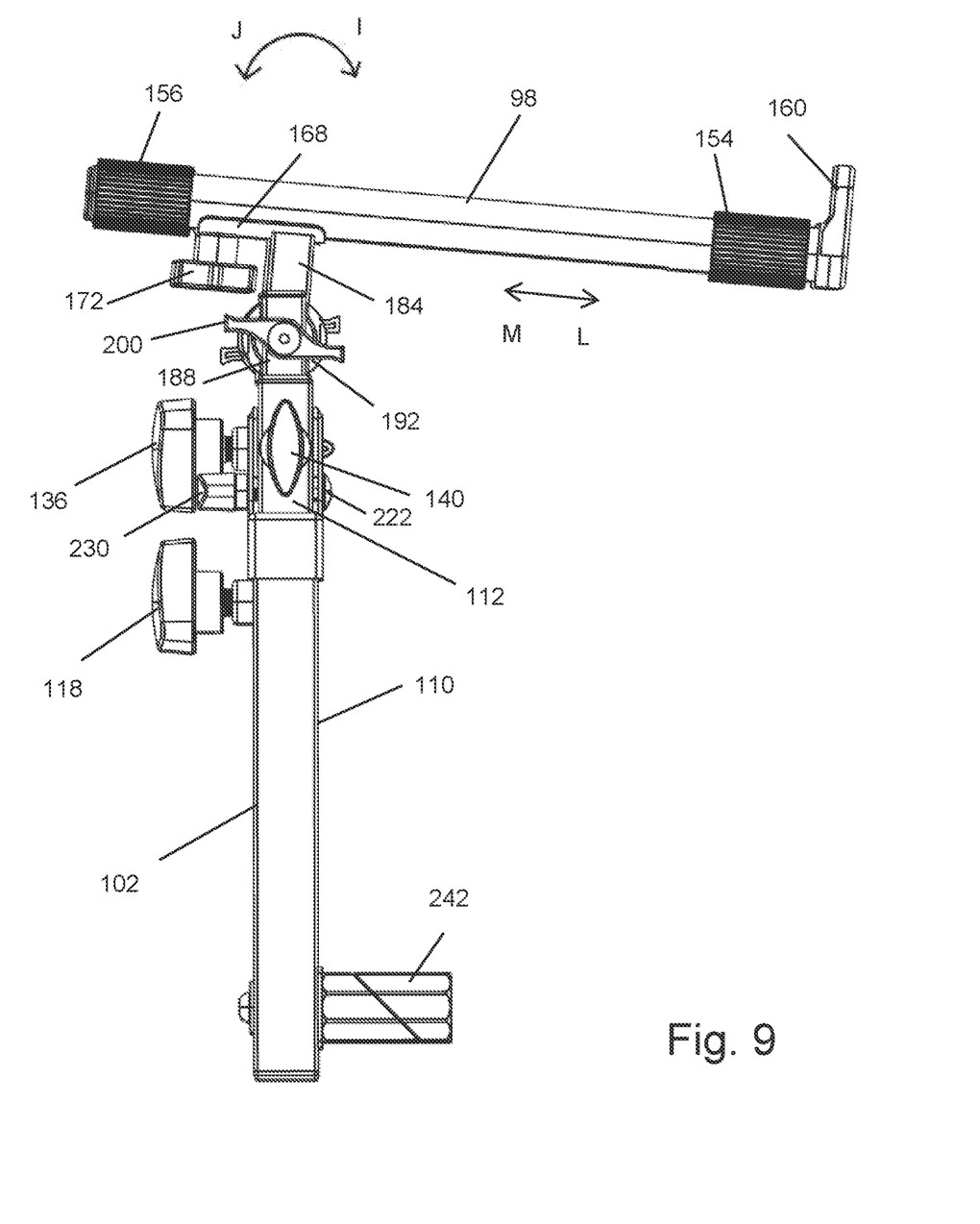
FIG. 9 is a side view of the additional tier stand of FIG. 1.

In some embodiments, the arms 96, 98 are extendable and retractable longitudinally in the directions L and M, respectively, labeled in FIGS. 7, 9, and 14, relative to the arm mounts 162, 164 and therefore relative to the cross member 104. The arm mounts 162, 164 comprise an extension mechanism 211. The mechanism 211 comprises a clamp, comprising the cradle 166, 168, the fastener 170, 172, and a channel member 213. The arms 96, 98 comprise a hollow interior channel 215 bounded by the exterior wall(s) 217 of the arms 96, 98, as shown in FIG. 14 where the arms are shown transparently. The channel member 213 is positioned within the channel 215 and against at least a bottom of the wall 217 of the arms 96, 98, opposite of the cradle 166, 168. The fastener 170, 172 passes through the cradle and is threaded into a fastener bore 219 of the channel member 213. When the fastener is tightened the fastener will draw the channel member 213 against the wall 217 of the arms 96, 98, such as at the bottom of the wall 217, and the wall 217 against the cradle 166, 168, as shown in FIG. 14. This will clamp and provide a friction force on the wall 317 of the arm 96, 98 between the channel member 213 and the cradle 166, 168. The fastener can be tightened such that the friction force applied by the clamp prevents the arm from moving longitudinally in the directions M and L relative to the arm mounts 162, 164. In some embodiments, the cradle comprises a post 221 that extends through an aperture in the channel member 213 to align the channel member relative to the cradle.

The arms 96, 98 comprise an elongated slot 223 in a bottom of the wall 217 extending longitudinally along a length of the arms 96, 98. In some embodiments, the slot extends along a substantial three-fifths of the length of the arms. The fastener 170, 172 and the post 221 extend through the slot 223 when extending between the cradle 166, 168 and the channel member 213.

The arms 96, 98 are slidable in the directions M and L within the range provided by the slot 223. In operation, the fastener is loose or loosened so the there is insufficient clamping force between the cradle and the channel member to prevent the arms from moving in directions M or L. Then the arm(s) is moved in the direction M or L until the arm is at a desired location relative to the arm mounts 162, 164 and therefore relative to the posts 182 184 and cross member 104. Then the fastener is tightened so that the clamping force applied between the cradle and channel member prevents further movement of the arms in the direction M and L.

Figure 5:
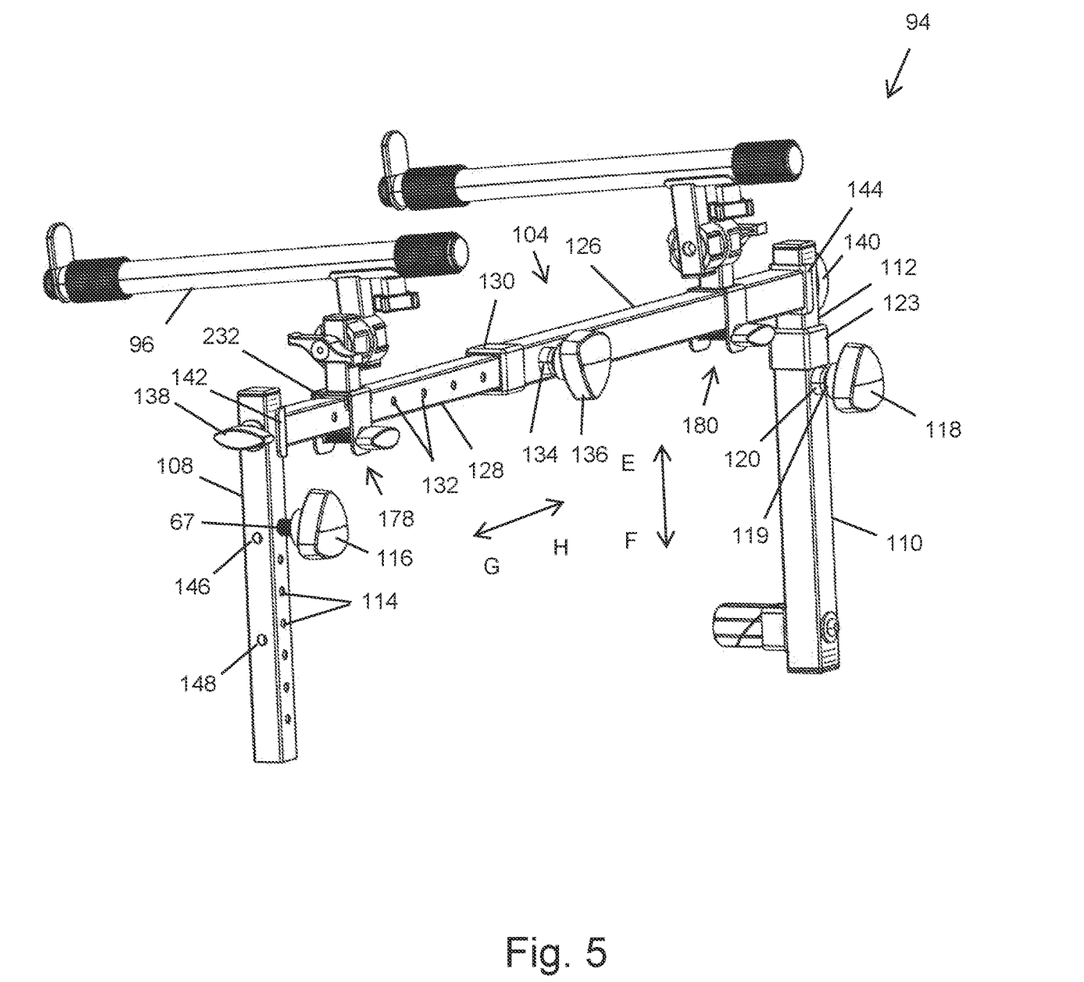
FIG. 5 is a rear perspective view of the additional tier stand of FIG. 1 with one leg segment not shown.

The cross member connection mechanisms 178, 180 are the same, so only mechanism 180 will be described in detail and labeled in FIG. 7. The cross member connection mechanism 178, 180 is connected to the second post 186, 188. In some embodiments, the connection mechanism 178, 180 comprises a clamp. The clamp comprises a rectangular U-shaped frame, comprising a top plate 214, a first side plate, 216, and a second side plate 218. The top plate 214 rests on the top wall of the cross-member as shown in FIGS. 1, 5, and 6. The side plates 216, 218 are located on opposite side walls of the cross-member 104 as shown in FIGS. 1, 5, and 6. Therefore the cross member 104 is located inside of the clamp when the clamp is mounted to the cross member. A fastener 220, such as a bolt and nut combination extends through apertures in the side plates 216, 218 and under the cross member 104.

The fastener 220 may comprise a bolt with a head 222 having a square back 224. The square back 224 is received in a correspondingly square shaped aperture 226 in the side plate 218 as shown in FIG. 7. When the square back 224 of the head is received in the square shaped aperture 226 the bolt is prohibited from rotating or substantially rotating beyond the tolerances between the square back and the square aperture. The bolt comprises a threaded shaft 228 extending from the head. The shaft 228 extends through an aperture in plate 216, A nut 230, which may comprise a knob, is threaded on to the shaft on an outside of plate 218 as shown in FIG. 7. In some embodiments, a spacer 232 is used between the clamp of the cross member connection mechanisms 178 and the second segment 128 of the cross member 104 as shown in FIGS. 5 and 6.

When the nut 230 is tightened along the shaft of the bolt, the plates 216, 218 are drawn together and against the cross-member 104 that is in between the plates 216, 218. The drawing together of the plates creates a clamping force and friction on the cross member that secures the cross member connection mechanisms 178, 180, the angle adjust mechanism 174, 176, and the arms 96, 98 to the cross member 104. When the nut and the clamp is loosened, the arms 96, 98 and the associated arm connection mechanisms 162, 164 can be positioned in the user-desired locations along the width of the cross member in the directions G, H.

Figure 10:
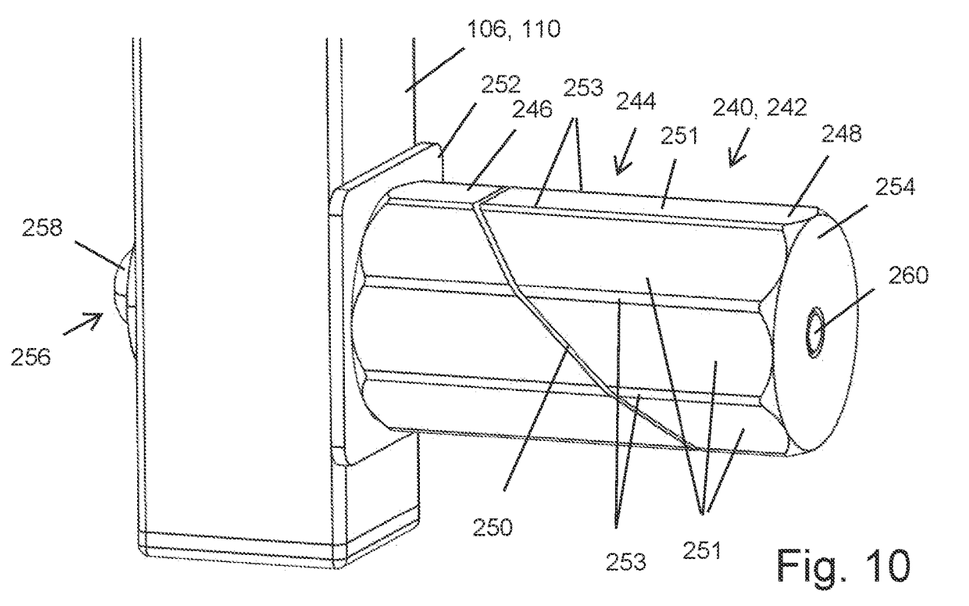
FIG. 10 is a side perspective view of base stand mounts connected to legs of the additional tier stand of FIG. 1.
Figure 11:
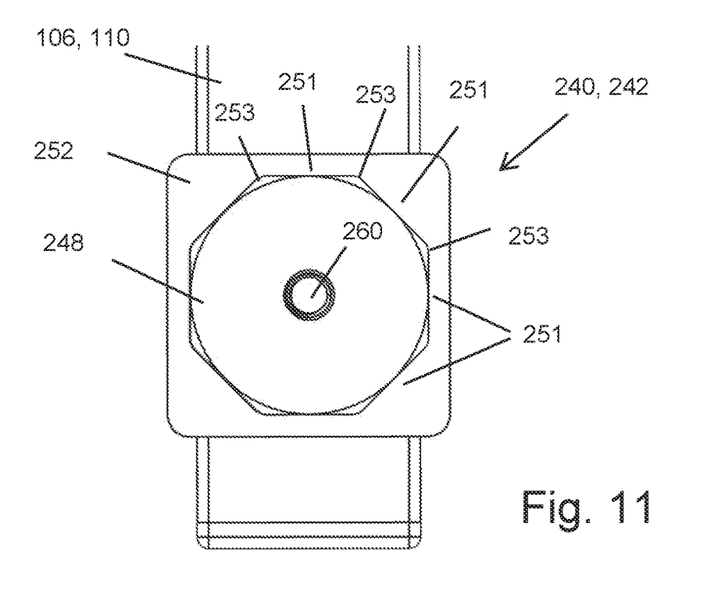
FIG. 11 is a terminal end view of the base stand mounts of FIG. 10.
Figure 12:
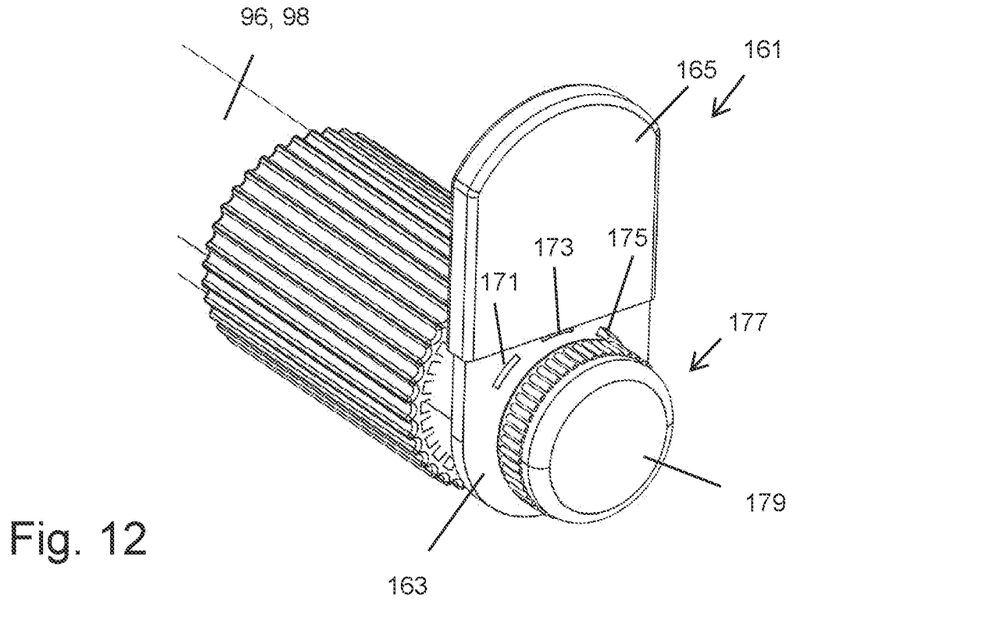
FIG. 12 is an end perspective view of the arms of the additional tier stand of FIG. 1 with a second embodiment lip.

Each of the legs 100, 102 comprise a base stand mount 240, 242. The base stand mounts are identical. The mounts are transverse to and project from the leg segment 106, 110 and in some embodiments the mount projects at a right angle from the leg segments. The mounts comprise a body 244 that comprises a proximal segment 246 and a distal segment 248. The body 244 may comprise a diagonal break 250 between the segments 246, 248 so that a top of the segment 246 has a length that is shorter than a length of the top of segment 248 and a bottom of segment 246 has a length that is longer than a length of the bottom of segment 248, as shown in FIG. 10. The exterior of the body 244 comprises a plurality of sides 251 and a plurality of edges 253 about its perimeter between a base plate 252 and the distal end 254. In some embodiments, the body has an octagonal perimeter comprising eight sides 251 as shown in FIG. 11 and a corresponding eight edges 253 between the sides 251. A fastener 256, such as a bolt, has a head 258 and a shaft 260. The shaft 260 extends through the leg segments 106, 110 from a first side where the head is located to a opposite second side were the mount 240, 242 is located. The shaft 260 comprises threads that engage an interior of the distal segment 248.

Rotation of the fastener 256 will cause the rotation of the distal segment 248. When the stand mounts 240, 242 are in a hollow interior of the terminal ends of the arms 36, 38 of the base stand 14 as shown in FIG. 1, the rotation of the fastener 256 will cause the rotation of the distal segment 248 within the arm 36, 38 and this will drive one or more of the edges 253 of the body against the interior wall(s) of the arm 36, 38. The rotation of the distal segment 248 expands the radial diameter of the body 244 as the edges 253 of the distal segment are not aligned with the edges 253 of the proximal segment, therefore the unaligned edges of the distal segment cause a greater diameter of the body than when the edges 253 of both the proximal and distal segments are aligned. The rotation of the distal segment will provide a pushing force and friction against the interior wall(s) that will secure the mount against the interior wall(s) of the hollow interior of the arms. The expansion of the body 244 will stop when edges 253 of the distal segment pass the midpoint between adjacent edges of the proximal segment, such as when rotated freely outside of arm 36, 38. Often the body 244 and the hollow interior of the arms 36, 38 will be sized such that the body cannot be fully expanded and the distal segment cannot be rotated such that the edges 253 of the distal segment pass the midpoint between adjacent edges of the proximal segment when the body is within the arms 36, 38.

To deploy and mount the additional tier stand 12 on the base stand 14, base stand mounts 240, 242 are aligned with an opening in the terminal end 37 (FIG. 2) of the arms 36, 38 of the base stand 14. The width of the cross member 104 can be adjusted as desired or necessary to align the mounts 240, 242 with the arms 36, 38 of the base stand 14. The mounts 240, 242 are inserted, in the direction K of FIG. 1, into the hollow interior of the terminal end 37 of the arms 36, 38. The fastener 256 is turned causing the distal segment 248 to rotate partially within the hollow interior of the arms 36, 38 and this will drive one or more of the edges 253 of the body against the interior wall(s) of the arm 36, 38 to provide a pushing force and friction that will secure the mount against the interior wall(s) of the hollow interior of the arms. To disconnect the additional tier stand 12 from the base stand 14, the fastener 256 is reversed or loosened, which rotates the distal segment 248 in an opposite direction causing one or more of the edges 253 of the body 244 to move away from engagement with the interior wall(s) of the hollow interior of the arms. This loosens the connection between the mounts 240, 242 and the arms 36, 38. The mounts 240, 242 can be withdrawn from the arms 36, 38 in the direction opposite direction K to disconnect the additional tier stand 12 from the base stand 14.

One or more embodiments of the additional tier stand 12 comprises one or more of the following features: the height of the arms 96, 98 can be simultaneously adjusted together via the cross member connection to the adjustable legs 100, 102 and the adjustment of the height of the legs; the frame and the distance between legs 100, 102 are width adjustable to meet the width of the arms 36, 38 of the base stand, to allow for the width adjustability of the base stand, and to provide modular flexibly for attaching to more than one base stand; and/or a height and elevation angle adjustable stand for holding an additional musical keyboard, another musical instrument, synthesizer, drum machine, speakers, laptop computer, or other devices for music production above a base stand.

From the foregoing, it will be observed that numerous variations and modifications may be affected without departing from the spirit and scope of the invention. It is to be understood that no limitation with respect to the specific apparatus illustrated herein is intended or should be inferred. For example, one or more component embodiments may be combined, modified, removed, or supplemented to form further embodiments within the scope of the invention. Further, steps could be added or removed from the processes described. Therefore, other embodiments and implementations are within the scope of the invention.

The invention claimed is:

1. An additional tier stand, comprising:
   an extendable first leg comprising a first base stand mount configured to connect to a base stand;
   an extendable second leg comprising a second base stand mount configured to connect to the base stand;
   a cross member connected to and spanning between the first leg and the second leg;
   a first support arm supported on the cross member;
   a first pivot joint connected to the first support arm and to the cross member and configured to enable an adjustment of a first elevation angle of the first support arm;
   a second support arm supported on the cross member; and,
   a second pivot joint connected to the second support arm and to the cross member and configured to enable an adjustment of a second elevation angle of the second support arm.

2. The additional tier stand of claim 1, wherein the first base stand mount comprises a first projection connected transverse to a first segment of the first leg and the second base stand mount comprises a second projection connected transverse a first segment of the second leg.

3. The additional tier stand of claim 1, wherein the first base stand mount comprises a body projecting from a bottom of the first leg, the body comprises a proximal segment and a distal segment, the distal segment is rotatable a predefined amount relative to the proximal segment to expand a diameter of the body.

4. The additional tier stand of claim 1, wherein the first leg and the second leg each comprise a bottom end and a top end, the first base stand mount is at the bottom end of the first leg, the second base stand mount is at the bottom of the second leg, and the cross member is connected to the top end of each of the first leg and the second leg.

5. The additional tier stand of claim 1, wherein the cross member comprises a first segment and a second segment, the second segment is received in the first segment, the first segment and the second segment are movable relative to the other to expand or contract a width of the cross member.

6. The additional tier stand of claim 5, wherein the cross member comprises a releasable stop to releasably fix the first segment to the second segment.

7. The additional tier stand of claim 5, wherein the cross member comprises a first releasable stop pin comprising a threaded proximal portion and a distal pin portion, the threaded proximal portion is configured to engage a threaded aperture of the first segment, and the distal pin portion configured to engage a selected aperture of a plurality of width set apertures of the second segment.

8. The additional tier stand of claim 1, wherein the first leg comprises a first leg segment and a second leg segment, the second leg segment is received in the first leg segment, the first leg segment and the second leg segment are movable relative to the other to expand or contract a height of the first leg; the second leg comprises a third leg segment and a fourth leg segment, the fourth leg segment is received in the third leg segment, the third leg segment and the fourth leg segment are movable relative to the other to expand or contract a height of the second leg.

9. The additional tier stand of claim 8, wherein the first leg comprises a first releasable stop to releasably fix the first leg segment to the second leg segment; the second leg comprises a second releasable stop to releasably fix the third leg segment to the fourth leg segment.

10. The additional tier stand of claim 8, wherein the first leg comprises a first releasable stop pin comprises a threaded proximal portion and a distal pin portion, the threaded proximal portion is configured to engage a threaded aperture of the first leg segment, and the distal pin portion configured to engage a selected aperture of a plurality of height set apertures of the second leg segment.

11. The additional tier stand of claim 1, wherein the first support arm and the second support arm are laterally positionable along a width of the cross member.

12. The additional tier stand of claim 1, wherein the first pivot joint comprises a first gear and a second gear, the first gear is selectively engageable with the second gear to select the first elevation angle of the first support arm.

13. The additional tier stand of claim 1, comprising a first arm mount connecting the first support arm to the cross member, the first support arm comprises a slot, the first arm is extendable and retractable relative to the cross member along a length of the slot; the first arm mount comprises an arm clamp for releasably fixing the first support arm along the length of the slot; the clamp comprises a cradle, a channel member, and a fastener for releasably connecting the cradle to the channel member, the first arm is supported on the cradle, the channel member is within a hollow interior channel of the first support arm, the fastener extends through the slot and connects the channel member to the cradle.

14. The additional tier stand of claim 1, wherein the first support arm comprises a first front lip and a protrusion, the lip comprises a mount aperture and a plurality of lip angle set apertures positioned radially about the mount aperture, the lip is releasably received on a selected one of the plurality of lip angle set apertures to deploy the lip at a selected angle.

15. An additional tier stand, comprising:
   an extendable first leg comprising a first base stand mount configured to connect to a base stand;

an extendable second leg comprising a second base stand mount configured to connect to the base stand;
a cross member connected to and spanning between the first leg and the second leg;
a first support arm supported on the cross member;
a second support arm supported on the cross member;
a first support arm elevation angle adjust mechanism connected to the first support arm; and,
a second support arm elevation angle adjust mechanism connected to the second support arm.

16. An additional tier stand, comprising:
a height adjustable first leg;
a first base stand mount projecting from a bottom of the first leg;
a height adjustable second leg;
a second base stand mount projecting from a bottom of the second leg;
a cross member connected to and spanning between the first leg and the second leg;
a first support arm supported on the cross member,
a first pivot joint connected to the first support arm and to the cross member and configured to enable an adjustment of a first elevation angle of the first support arm; and,
a second support arm supported on the cross member,
a second pivot joint connected to the second support arm and to the cross member and configured to enable an adjustment of a second elevation angle of the second support arm.

17. The additional tier stand of claim 16, wherein the first leg and the second leg each comprise a top end, the cross member is connected to the top end of each of the first leg and the second leg.

18. The additional tier stand of claim 16, wherein the cross member comprises a first segment, a second segment, and a stop; the second segment is received in the first segment, the first segment and the second segment are movable relative to the other to expand or contract a width of the cross member, the stop releasably fixes the first segment to the second segment.

19. The additional tier stand of claim 18, wherein the first leg comprises a first leg segment and a second leg segment, the second leg segment is received in the first leg segment, the first leg segment and the second leg segment are movable relative to the other to expand or contract a height of the first leg; the second leg comprises a third leg segment and a fourth leg segment, the fourth leg segment is received in the third leg segment, the third leg segment and the fourth leg segment are movable relative to the other to expand or contract a height of the second leg.

20. A method of adjusting a height of support arms of an additional tier stand, comprising the steps of:
loosening a first stop of a first leg of the additional tier stand;
loosening a second stop of a second leg of the additional tier stand;
extending or contracting the first leg and second leg to raise or lower a plurality of support arms simultaneously via a cross member connected to the first leg and the second leg;
setting the first stop and the second stop;
adjusting a first elevation angle of a first support arm of the plurality of support arms; and,
adjusting a second elevation angle of a second support arm of the plurality of support arms.

* * * * *